United States Patent [19]
Beard et al.

[11] Patent Number: 5,225,885
[45] Date of Patent: Jul. 6, 1993

[54] APPARATUS FOR DETERMINING THE ATTITUDE OF A CELESTIAL BODY ORBITING SPACECRAFT OR SATELLITE RELATIVE TO THE CELESTIAL BODY

[75] Inventors: Christopher I. Beard, Stevenage; Stephen D. Hayward, Bewdley, both of Great Britain

[73] Assignee: British Aerospace Public Limited Company, London, England

[21] Appl. No.: 822,276

[22] Filed: Jan. 21, 1992

[30] Foreign Application Priority Data

Jan. 22, 1991 [GB] United Kingdom ............... 9101419

[51] Int. Cl.⁵ ............................................. G01B 11/26
[52] U.S. Cl. ..................................... 356/141; 356/152
[58] Field of Search ................................ 356/141, 152

[56] References Cited

U.S. PATENT DOCUMENTS

4,516,263 5/1985 Dew et al. .
5,068,522 11/1991 Falp et al. .................... 356/141 X

FOREIGN PATENT DOCUMENTS

| 0135065 | 3/1985 | European Pat. Off. . |
| 0405678 | 1/1991 | European Pat. Off. . |
| 2533883 | 4/1984 | France . |
| 2569842 | 3/1986 | France . |
| 2656486 | 6/1991 | France . |
| 86/01593 | 3/1986 | PCT Int'l Appl. . |
| 2145597 | 3/1985 | United Kingdom . |
| 2197718 | 5/1988 | United Kingdom . |

OTHER PUBLICATIONS

English abstract of Hiroshi SOGA Japanese laid open application No. 63-252719, Apr. 1990.
Ninomiya et al. "CCD Star Tracker for Scientific Satellites", Nec Research and Development, Apr. 1988, pp. 63-71.

*Primary Examiner*—Mark Hellner
*Attorney, Agent, or Firm*—Cushman, Darby & Cushman

[57] ABSTRACT

The apparatus includes a solid state, two-dimensional, array (4) of elements or pixels fixedly attachable to the spacecraft or satellite (2) so that the array boresight (5) is aligned with the nominal Celestial Body pointing axis of the spacecraft or satellite (2). The elements or pixels are sensitive to illumination in the visible to near infrared wavelength range, sense an image of Celestial Body (3) falling thereon and indicate the relative intensity of illumination falling on each element or pixel from the image. Optical means focus the image of Earth onto the array (4) and means for digitally sampling and processing the relative intensity of illumination information indicated by the array (4) operate to produce coordinates of the center (7) of the Celestial Body image on the array (4) whose displacement in two orthogonal axes from the center of the field of view of the array (4) provides an indication of the roll and/or pitch attitude error of the spacecraft or satellite (2).

11 Claims, 1 Drawing Sheet

APPARATUS FOR DETERMINING THE ATTITUDE OF A CELESTIAL BODY ORBITING SPACECRAFT OR SATELLITE RELATIVE TO THE CELESTIAL BODY

FIELD OF THE INVENTION

This invention relates to apparatus for determining the attitude of a Celestial Body Orbiting Spacecraft or Satellite relative to the Celestial Body, and is particularly, but not exclusively, suitable for use on satellite orbiting and viewing the Earth either in geostationary orbit or other orbits having altitudes of for example between 10,000 kilometers and 100,000 kilometers from the earth.

BACKGROUND OF THE INVENTION

Spacecraft such as satellites orbiting the Earth to view or monitor the Earth require to be aligned and maintained in alignment with the Earth. Movement away from a nominal earth pointing attitude requires to be sensed for a correction to be made to return the satellite to the nominal Earth pointing direction. Conventionally the attitude of an Earth orbiting spacecraft or satellite relative to the Earth is determined by a sensor assembly which is sensitive to illumination in the infra-red waveband, i.e. in the range of from 12 to 14 microns. Such a conventional Earth attitude determining sensor operates by repeatedly scanning the field of view of a small number, typically, four sensors sensitive to infra-red radiation across the Earth/space horizon. The roll and/or pitch attitude error of the spacecraft or satellite relative to the nominal Earth pointing direction is obtained from timing information from these horizon crossings. Such a conventional Earth attitude determining sensor is prone to reliability problems. For example scanning of the sensors is carried out mechanically by means of movable scanning mirrors and these scanning mirrors can stick due to heat problems from radiation from the sun or from the other parts of the spacecraft or satellite. Additionally such a conventional attitude determining assembly is also subject to interference from other celestial bodies such as the Moon or Sun and from reflections from other parts of the spacecraft or satellite which can be confused with an Earth/Space crossing.

OBJECTS OF THE INVENTION

Thus one object of the present invention is to provide a generally improved apparatus for determining the attitude of a Celestial Body orbiting spacecraft or satellite relative to the Celestial Body, which at least minimises the foregoing problems associated with conventional attitude determining assemblies.

This and other objects and advantages of the present invention will become more apparent from details disclosed in the following specification where preferred embodiments of the invention are described.

SUMMARY OF THE INVENTION

According to the present invention there is provided apparatus for determining the attitude of a Celestial Body orbiting Spacecraft or Satellite relative to the Celestial Body including a solid state, two-dimensional, array of elements or pixels fixedly attachable to the spacecraft or satellite so that the array boresight is aligned with the nominal Celestial Body pointing axis of the spacecraft or satellite, which elements or pixels are sensitive to illumination with a wavelength in the range of from substantially 0.4 to substantially 1.0 microns ($\mu$m) falling thereon and operable to sense an image of the Celestial Body falling thereon and indicate the relative intensity of illumination falling on each element or pixel from said image, optical means associated with the array and operable to focus the image of the Celestial Body onto the array of elements or pixels, and means for digitally sampling and processing the relative intensity of illumination information indicated by the array of elements or pixels to produce coordinates of the center of the Celestial Body image on the array whose displacement in two orthogonal axes from the center of the field of view of the array provides an indication of the roll and/or pitch attitude error of the spacecraft or satellite.

Preferably the array of illumination sensitive elements or pixels is a charge coupled device in which each element or pixel is a semi-conductor operable, when excited, to permit the storage of charge therein proportional to the intensity of illumination falling thereon.

Alternatively the array of illumination sensitive elements or pixels is a charge injection device.

As a further alternative the array of illumination sensitive elements or pixels may form an illumination sensitive imaging device incorporated in an Application Specific Integrated Circuit (ASIC).

Advantageously the optical means includes a field flattener lens element located in front of the array with respect to the direction of travel of illumination to the array and a focusing lens element located on the side of the field flattener lens element remote from the array.

Conveniently the optical means includes photochromic material located in the front of the array with respect to the direction of travel of illumination to the array.

Preferably the photochromic material forms part or all of the field flattener lens element.

Advantageously the optical means includes an aperture stop device and/or spectral filter operable to limit the wavelength of illumination falling on the matrix to within said range.

Conveniently the aperture stop device is a collimator forming part of, or associated with, the focusing lens element.

Preferably the spectral filter is a coating on the surface of the focusing lens element nearer, in use, to the Celestial Body.

Advantageously the digital sampling and processing means is locatable wholly or in part on the spacecraft or satellite or on the Celestial Body.

Preferably the digital sampling and processing means includes means for edge enhancing to select distinct boundaries between relatively bright and relatively dark areas of the Celestial Body image received by the array to indicate a Celestial Body/Space boundary and thereby reduce the amount of illumination data to be processed, and means for processing the reduced amount of illumination data to produce the coordinates of the center of the Celestial Body image on the array.

DESCRIPTION OF THE DRAWINGS

For a better understanding of the present invention, and to show how the same may be carried into effect, reference will now be made, by way of example, to the accompanying drawing, in which.

DESCRIPTION OF EMBODIMENTS OF THE INVENTION

Figure 1:
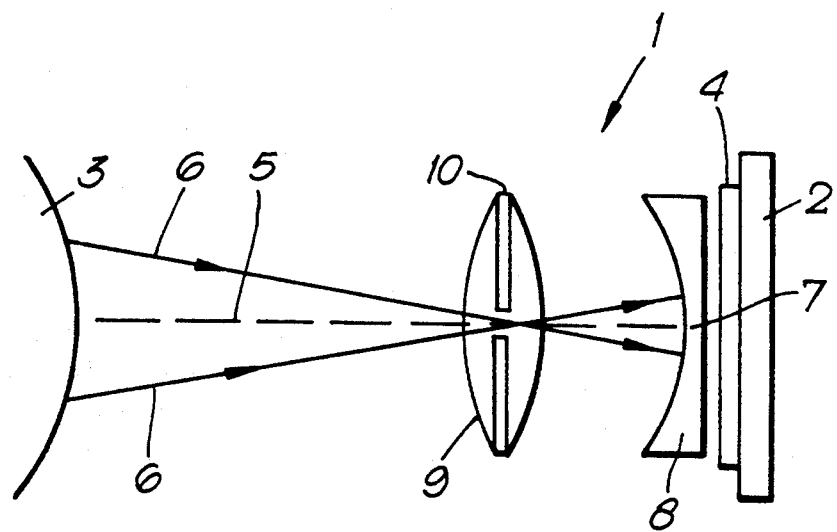
FIG. 1 is a schematic side view of an apparatus according to the present invention for determining the attitude of a Celestial Body orbiting spacecraft or satellite relative to the Celestial Body.

Apparatus of the invention is intended for use on a spacecraft or satellite orbiting a Celestial Body, such as the Earth, to determine the attitude of the spacecraft or satellite relative to the Celestial Body. The Celestial Body may be the Earth or other Celestial Body which is roughly spherical in shape and which is either illuminated by a Star or which is self radiating in the visible light waveband, for convenience an example of the apparatus of the invention will be described in terms of use for an Earth orbiting spacecraft or satellite.

Thus FIG. 1 of the accompanying drawing illustrates apparatus 1 for determining the attitude of an Earth orbiting spacecraft or satellite schematically, indicated at 2, relative to the Earth 3 includes a solid state, two-dimensional, array 4 of elements or pixels. The array 4 is fixedly attachable to the spacecraft or satellite 2 so that the array boresight 5 is aligned with the nominal Earth pointing axis of the spacecraft or satellite 2. The elements or pixels of the array 4 are sensitive to illumination 6 with a wavelength in the range of from substantially 0.4 to substantially 1.0 microns ($\mu$m) falling thereon and are operable to sense an image of Earth 3 falling on the elements or pixels and indicate the relative intensity of illumination falling on each element or pixel from the image.

The apparatus 1 also includes optical means associated with the array 4 and operable to focus the image of Earth 3 onto the array 4. Additionally the apparatus 1 includes means for digitally sampling and processing the relative intensity of illumination information indicated by the array 4 to produce coordinates of the center of the Earth image 7 on the array 4 whose displacement in two orthogonal axes from the center of the field of view of the array 4 provides an indication of the roll and/or pitch attitude error of the spacecraft or satellite 2.

According to one embodiment of the present invention the array 4 of illumination sensitive elements or pixels is a charge-coupled device in which each element or pixel is a semi-conductor operable, when excited, to permit the storage of charge therein proportional to the intensity of illumination falling thereon. Such a charge-coupled device is read out by sequentially passing charge from one element or pixel to the next by transferring the charge contents from one pixel to the next.

According to an alternative embodiment the array 4 of illumination sensitive elements or pixels is a charge injection device. Such a charge injection device has two capacitors associated with each element or pixel which in this device is usually termed a photosite. The charge injection device may be read out by switching the contents of one photosite, which itself forms the first of the two capacitors, into its second associated capacitor. Additionally the charge injection device has a plurality of metallic strips extending in x and y axes which then pick up an induced signal when the contents switching takes place.

However according to a preferred embodiment of the present invention the array 4 of illumination sensitive elements of pixels forms an illumination sensitive imaging device incorporated in an Application Specific Integrated Circuit (ASIC). This ASIC should include on-chip drivers and a read out stage.

The array 4 is thus a solid state "staring array" which does not have any movable parts and which does not require the use of a scanning mechanism to view the Earth as is required by conventional attitude determining apparatus.

Hence the apparatus of the present invention has improved reliability and does not encounter any problems of scanning mirrors sticking in position due to thermal effects as encountered by the conventional attitude determining apparatus. Typically a suitable two-dimensional array of imaging elements or pixels will be made up of 256 pixels in one direction ×256 pixels in an orthogonal direction. Such an array provides an accuracy in Earth center position determination comparable to conventional infra-red attitude determination apparatus. Arrays with more pixels can be employed to give greater accuracy but this is at the expense of an increased processing burden. Preferably the exposure time of the array 4 is adjustable for the array to operate over a wide range of illumination conditions.

In the apparatus of the invention the optical means associated with the array 4 and operable to focus the image of Earth 3 onto the array 4 includes a field flattener lens element 8 located in front of the array 4 with respect to the direction of travel of illumination 6 to the array 4 and a focusing lens element 9 located on the side of the field flattener lens element 8 remote from the array 4 as can be seen from FIG. 1. The element 8 operates to remove off-axis distortions arising from use of a spherically symmetric lens element 9 focussing on to a flat image plane. If these distortions are acceptable the element 8 can be dispensed with or the lens element 9 can be a multi-elements lens which can provide both focussing and field flattening functions.

The optical means may also include photochromic material located in front of the array 4 with respect to the direction of travel of illumination 6 to the array 4. This photochromic material may form part or all of the field flattener lens element 8 which may be shaped from photochromic glass or organic photochromic material, so that the photochromic material reduces the effects on the array of over-illumination if, for example, the Sun is in the field of view.

The optical means also includes an aperture stop device and/or spectral filter 10 operable to limit the wavelength of illumination 6 falling on the array 4 to within the previously specified range. The apparatus may be designed to use all or part of this range. The field of view of the optical means is matched to that of the array 4 and is typically 40°×40°. This field of view is chosen to contain the full Earth image at geostationary altitude for satellite mispointing in the range minus 10° to plus 10°. However, a different but fixed field of view can be considered according to the mission requirements, e.g. to accommodate other operating ranges of mispointing or a different range of apparent angular dimension of the Celestial Body. The use of a lens assembly made up of a single focusing lens element 9 and a single field flattener lens element 8 minimises the number of optical surfaces so as to reduce the effect of flare and ghost imaging.

The aperture stop device may be a collimator forming part of, or associated with, the focusing lens element 9, for example built within the element 9. The aperture of the aperture stop device is fixed, not variable, and the exposure of the apparatus array 4 is controllable by control of the integration time of the image as a function of the drive circuitry.

The spectral filter may be a coating on the surface of the focusing lens element 9 nearer, in use, to the Earth.

The digital sampling and processing means is locatable wholly or in part on the spacecraft or satellite 2 or on the Earth 3. Preferably it forms part of the array 4 as will be hereinafter described. The digital sampling and processing means includes means for edge enhancing the image perceived by the array 4 to select distinct boundaries between relatively bright and relatively dark areas of the Earth image received by the array 4 to indicate an Earth/Space boundary and thereby reduce the amount of illumination data to be processed, and means for processing the reduced amount of illumination data to produce the coordinates of the center 7 of the Earth image on the array 4. Thus in practice the optical means focuses the Earth image onto the array 4 which stores the image until read out of the array of elements or pixels is initiated. The image is digitally sampled by the digital sampling and processing means and this data is operated on with digital image processing techniques to produce as an output the coordinates of the Earth center 7 in this image. The array boresight 5 is aligned with the nominal earth pointing axis of the satellite 2 and thus a roll or pitch mispointing of the spacecraft or satellite 2 from nominal Earth pointing will produce an offset of the Earth image from the center 7 of the field of view of the array 4. The assembly measures the offset in two orthogonal axes to determine the roll and pitch attitude error of the spacecraft or satellite 2.

The apparatus of the invention operates in two modes namely an acquisition mode and a fine pointing mode. In the acquisition mode the position of the Celestial body such as the Earth 3 within the field of view of the array 4 is completely unknown and only a coarse accuracy is required for the Earth center determination. This mode is required for "Earth acquisition" which is a manoeuvre generally performed when the spacecraft or satellite 2 first arrives on station or as part of recovery manoeuvres following an emergency Sun acquisition in which spacecraft is pointed to the Sun. In the fine pointing mode the Earth has already been acquired and the satellite is pointing towards the Earth to within a few degrees of nominal. In this mode the highest accuracy is required but the position of the Earth can be considered to be known to this level of accuracy and from one output cycle to the next the position of the Earth within the field of view of the array 4 will not change significantly.

The digital sampling and processing means is such that the processor side is required to execute image processing algorithms necessary to extract the position of the Earth's center from the image. Different algorithms are appropriate for the acquisition mode and for the fine pointing mode. For each mode two basic image processing techniques are required. Firstly in order to reduce the amount of data to be processed the image is edge enhanced to select distinct boundaries between bright areas of the image and dark areas of the image. This enables data describing the Earth/Space boundary to be identified. Secondly the reduced data information is processed to obtain the coordinates of the Earth's center position.

On suitable edge enhancement technique is to use the Sobel operator for both fine pointing mode and acquisition mode. In the Sobel operator technique a 3×3 pixel kernel convolution filter is employed. For Earth center determination a matched filter technique is preferable for the fine pointing mode whilst the use of the Hough Transform is preferred for the acquisition mode. The Hough Transform is a known technique for transforming objects in an image into less complex forms for easier handling. For example for determining the existence and position of a Celestial Body such as the Earth in an image, a Hough circle transform is used to map circles of known radius into points. In each case the output of these combined image processing techniques is, roll angle, pitch angle and an Earth presence status which indicates whether or not the Earth is present in the field of view of the array 4.

The implementation of the required algorithms is achievable by use of either a general purpose digital signal processor implementing the algorithms in software or by a hardware implementation of the algorithms for example using an Application Specific Integrated Circuit.

The digital sampling and processing means is locatable wholly or in part on the spacecraft or satellite 2 or on the Earth 3. Preferably the digital sampling and processing means forms part of the array 3 so that the array 3 sensing function and digital sampling processing means are performed on a single Applications Specific Integrated Circuit (ASIC).

The apparatus of the present invention has lower mass, lower power requirements, smaller volume and potentially greater reliability than the conventional infra-red attitude determining apparatus. By the use of a two-dimensional imaging array the apparatus of the invention determines the Celestial Body such as Earth, center position by processing the outputs of all elements or pixels. This gives greater resistance to interference by the Moon and Sun and stray reflections than where only a small number of Earth/Space crossings are considered since the array 4 of the present invention, which can be made up of 256×256 pixels, extracts maximum information from the image by processing all of the Earth/Space boundary. As digital processing techniques are employed the performance is less or not prone to degradation due to ageing and environment that affects a comparable implementation and greater flexibility is achieved.

Various modifications and alterations may be made to the embodiments of the present invention described and illustrated, within the scope of the present invention as defined in the following claims.

What is claimed is:

1. Apparatus for determining the attitude of a Celestial Body orbiting spacecraft relative to the Celestial Body, including:

a solid state, two dimensional array of elements fixedly attachable to the spacecraft or satellites so that an array boresight is aligned with a nominal Celestial Body pointing axis of the spacecraft, which elements are sensitive to illumination with a wavelength in the range of from substantially 0.4 to substantially 1.0 microns ($\mu$m) falling thereon and operable to sense an image of the Celestial Body falling thereon and indicate the relative intensity of illumination falling on each element from said image, optical means associated with the array and operable to focus the image of the Celestial Body onto the array of elements, and means for digitally sampling and processing the relative intensity of illumination information indicated by the array of elements to produce coordinates of the center of the Celestial Body image on the array whose displacement in two orthogonal axes from the center of the field of view of the array provides an indication of at least one of roll and pitch attitude error of the spacecraft, wherein said digital sampling and processing means includes means for edge enhancing to select distinct boundaries between relatively bright and relatively dark areas of the Celestial Body image received by the matrix to indicate an Celestial Body/Space boundary and thereby reduce the amount of illumination data to be processed, and means for processing the reduced amount of illumination data to produce the coordinates of the center of the Celestial Body image on the array.

2. Apparatus according to claim 1, wherein the array of illumination sensitive elements is a charge coupled device in which each element is a semi-conductor operable, when excited, to permit the storage of charge therein proportional to the intensity of illumination falling thereon.

3. Apparatus according to claim 1, wherein the array of illumination sensitive elements is a charge injection device.

4. Apparatus according to claim 1, wherein the array of illumination sensitive elements forms an illumination sensitive imaging device incorporated in an Application Specific Integrated Circuit (ASIC).

5. Apparatus according to claim 1, wherein the optical means includes a field flattener lens element located in front of the array with respect to the direction of travel of illumination to the array and a focusing lens element located on the side of the field flattener lens element remote from the array.

6. Apparatus according to claim 5, wherein the optical means includes photochromic material located in front of the array with respect to the direction of travel of illumination to the array.

7. Apparatus according to claim 6, wherein the photochromic material forms at least part of the field flattener lens element.

8. Apparatus according to claim 7, wherein the optical means includes an aperture stop device and/or spectral filter operable to limit the wavelength of illumination falling on the array to within said range.

9. Apparatus according to claim 8, wherein the aperture stop device is a collimator forming part of, or associated with, the focusing lens element.

10. Apparatus according to claim 8, wherein the spectral filter is a coating on the surface of the focusing lens element nearer, in use, to the Celestial Body.

11. Apparatus according to claim 1, wherein the digital sampling and processing means is locatable at least in part on the spacecraft or on the Celestial Body.

* * * * *